United States Patent [19]

Kilayko

[11] Patent Number: 5,526,695
[45] Date of Patent: Jun. 18, 1996

[54] PULSED FLOW METER

[75] Inventor: Enrique L. Kilayko, Rackliff Island, Me.

[73] Assignee: Sundstrand Corporation, Rockford, Ill.

[21] Appl. No.: 293,500

[22] Filed: Aug. 19, 1994

[51] Int. Cl.[6] .................................................. G01F 1/28
[52] U.S. Cl. ............................................... 73/861.71
[58] Field of Search ........................... 73/861.37, 861.38, 73/861.27, 861.57, 861.54; 604/246, 118

[56] References Cited

U.S. PATENT DOCUMENTS

| | | | |
|---|---|---|---|
| 2,927,176 | 3/1960 | Auld, Jr. | 73/861.57 |
| 3,017,885 | 1/1962 | Robicsek | 604/246 |
| 4,152,922 | 5/1979 | Francisco | 73/3 |
| 4,509,946 | 4/1985 | McFarlane | 604/246 |
| 4,699,617 | 10/1987 | Moriuchi et al. | 73/861.57 |
| 5,142,271 | 8/1992 | Bailey et al. | 73/861.57 |

*Primary Examiner*—Richard Chilcot
*Assistant Examiner*—Jewel V. Artis

[57] ABSTRACT

A movable magnet is captured in and biased toward one end of a passage. A pulse of flow moves this magnet and this movement is sensed by a sensor which sends a signal. A range adjusting channel with a valve therein permits adjustment of the flow which actuates the sensor.

5 Claims, 2 Drawing Sheets

PULSED FLOW METER

BRIEF SUMMARY OF THE INVENTION

This invention relates to the monitoring of the performance of pumping systems and particularly to those that use pumps which normally produce a sequence of pulses of flow.

The invention features a movable magnet captured in and biased toward one end of a passage. A pulse of flow moves this magnet and this movement is sensed by a sensor which sends a signal. A range adjusting channel with a valve therein permits adjustment of the flow which actuates the sensor.

DETAILED DESCRIPTION

Figure 1:
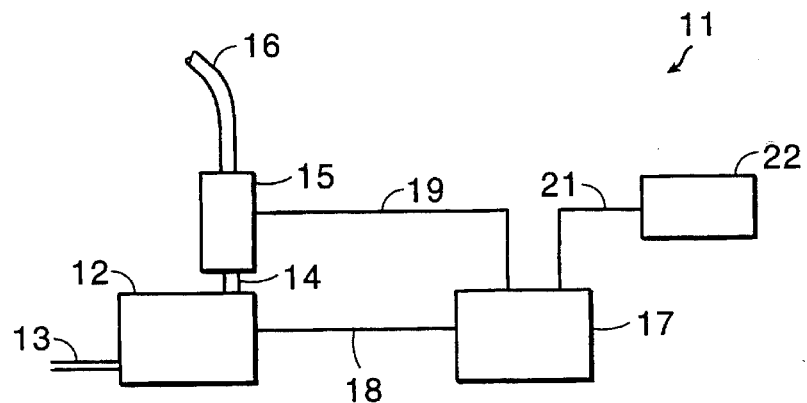
FIG. 1 shows a system for monitoring pulses of fluid according to the invention.

The invention may be described with the reference to the drawing.

As shown in FIG. 1, fluid delivery system 11 includes diaphragm pump 12 supplied with a fluid, which may be corrosive, through supply line 13 and delivering a pulsed flow of fluid through output line 14. From output line 14 the fluid passes through pulse flow monitor 15 to delivery line 16. Controller 17 is connected by connector 18 to pump 12, controlling the operation thereof, and by connector 19 to flow monitor 15, from which it receives monitoring signals, and by connector 21 to alarm 22.

Figure 2:
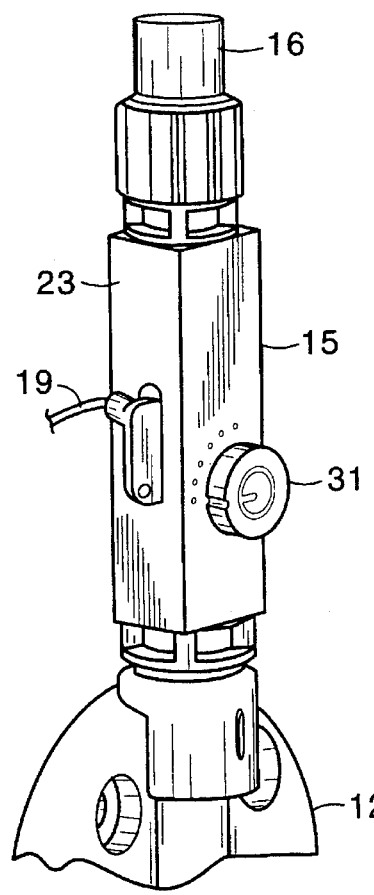
FIG. 2 shows a flow pulse monitor of FIG. 1 and according to the invention.
Figure 3:
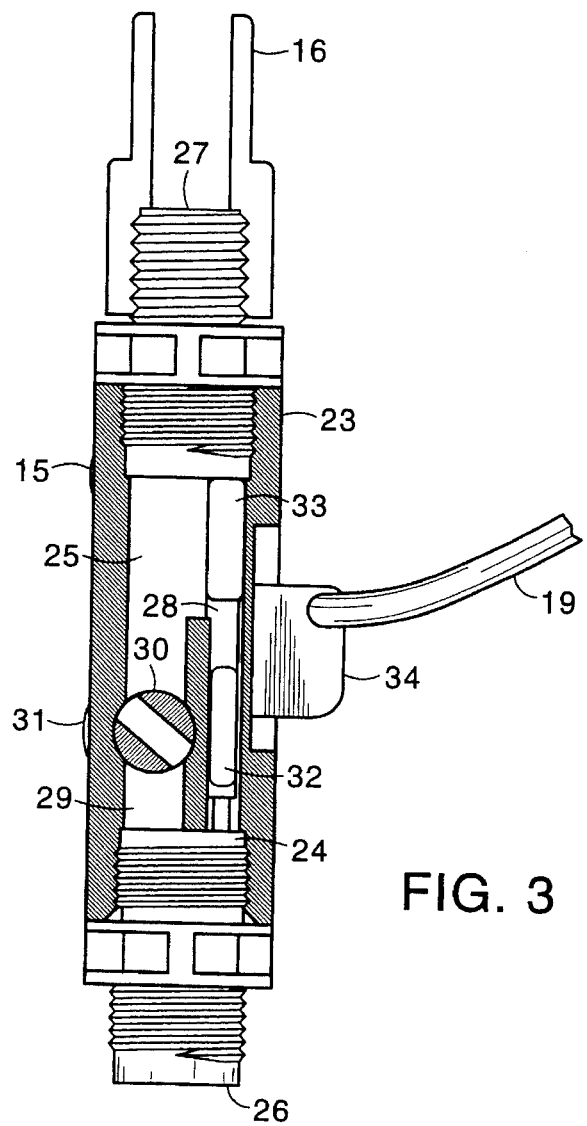
FIG. 3 shows a section through the flow pulse monitor of FIG. 2.

As shown particularly in FIGS. 2 and 3, pulse flow monitor 15 has body 23, advantageously made of a non-corrodible material such as ultra high weight polyethylene, which defines upstream plenum 24 and downstream plenum 24. Entrance port 26 communicates with upstream plenum 25; exit port 27 communicates with downstream plenum 25; and passage 28 communicates between upstream plenum 24 and downstream plenum 25. Range adjusting channel 29 with valve 30 therein also communicates between upstream plenum 24 and downstream plenum 25. Valve 30 is connected to and controlled by range adjusting control 31.

Magnet 32 is captured in passage 28 while being free to move within the passage towards upstream plenum 24 or downstream plenum 25. Magnet 33 is affixed to body 23. Magnet 33 is positioned, oriented and poled so that the interaction of the magnetic fields of the two magnets biases magnet 32 toward upstream plenum 24. Both of the magnets 32, 33 advantageously present a non-corroding surface to fluid passing through the monitor. This may be advantageously done by coating the magnets with polyvynaldiflouride.

Position sensor 34, responsive to magnetic field changes and advantageously a reed switch, is affixed to body 23 in proximity to passage 28 in position to sense the position of magnet 32 along passage 28. Sensor 34 delivers its output signal through connector 19 to controller 17.

Figure 4:
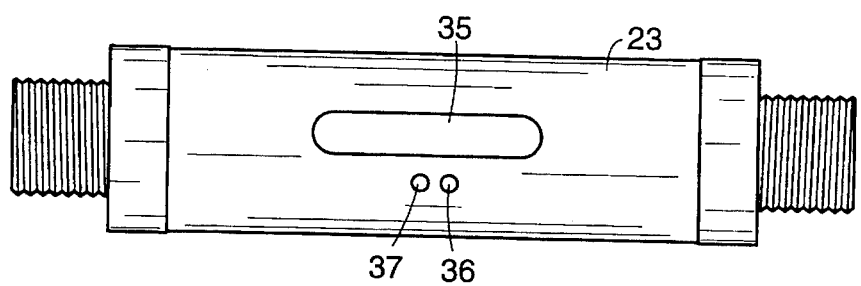
FIG. 4 shows a view of the body of the flow pulse monitor of FIG. 2.
Figure 5:
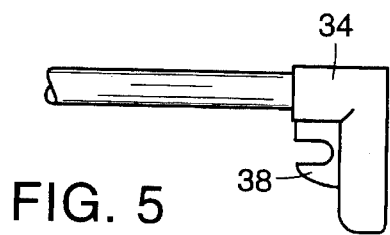
FIG. 5 shows a sensor which is part of the flow pulse monitor of FIG. 2.

As shown particularly in FIGS. 4,5, body 23 has on its outer surface a shallow trench 35 and alternative mounting holes 36 and 37. Encapsulated reed switch 34 is mounted in trench 35 with its mounting flange 38 affixed by a screw to one of holes 36,37. Depending on which of holes 36,37 is used, the reed switch will be positioned nearer to or farther from upstream plenum 24, with the result that the position of magnet 32 which throws the switch will be nearer to or farther from upstream plenum 24.

The operation of the pulse flow monitor is as follows.

With the pulse flow monitor installed in a pumping system as shown in FIG. 1 and with valve 30 fully open, the pump 12 is put in operation under the control of controller 17. The desired operating conditions of pump stroke volume and frequency are established. In this initial condition the flow through the monitor will be predominantly by way of the channel 29 with minimal flow through passage 28 so that flow through passage 28 will be insufficient to move magnet 32 far enough to trip reed switch 34. Then valve 30 is progressively closed causing increased pressure drop between the plenums and increased flow through passage 28. As valve 30 is progressively closed the excursion of magnet 32 along passage 28 will increase until the magnet on every pump pulse crosses the threshold for flipping the reed switch. This is the normal operating condition for the pulse flow monitor. In this normal operating condition the reed switch will be flipped and a signal therefrom will be sent to the controller for every normal pulse delivered by the pump. An insufficient pulse of flow from the pump, such as might be caused by malfunction of the pump or by presence of gas in the fluid line, will not drive the magnet 32 to the threshold for flipping the reed switch and will result in no pulse signal transmitted to the controller.

The threshold excursion of magnet 32 through passage 28 to flip the reed switch may be adjusted by changing the mounting point of the reed switch, which will in turn change the operating point of the monitor. When the reed switch is mounted closer to the upstream plenum the flow through the passage to move the magnet to the flip point will be less, and the monitor will be adapted to operate through a generally lower range of flows.

I claim:
1. A pulse flow monitor comprising
   a body defining an upstream plenum and a downstream plenum,
   an entrance port communicating with said upstream plenum for admitting fluid,
   an exit port communicating with said downstream plenum for delivering fluid,
   a passage in said body communicating between said upstream plenum and said downstream plenum,
   a first magnet captured in said passage and free to move along the passage,
   a second magnet affixed to said body and positioned and oriented so that its magnetic field biases said first magnet towards the upstream plenum,
   a range adjusting channel communicating between said upstream plenum and said downstream plenum, said channel having a valve therein, said valve being connected to a range adjusting control,
   a positioning sensor affixed to said body, said position sensor being effective to sense the position of said first magnet in said passage and provide a signal thereof.

2. A pulse flow monitor as claimed in claim 1, wherein said position sensor is a reed switch.

3. A pulse flow monitor as claimed in claim 1, wherein said body provides means for mounting said position sensor in a plurality of positions, so as to produce variable threshold of flow through said passage for actuation of the monitor response.

4. A pulse flow monitor as claimed in claim 1, wherein said body is made of non-corrodible material.

5. A pulse flow monitor as claimed in claim 4, wherein said first magnet presents a non-corroding surface to fluid passing through the monitor.

* * * * *